March 8, 1960 F. D. JONES 2,927,414
EAR PICK-UP ROLLERS FOR CORN HARVESTERS
Filed July 29, 1957
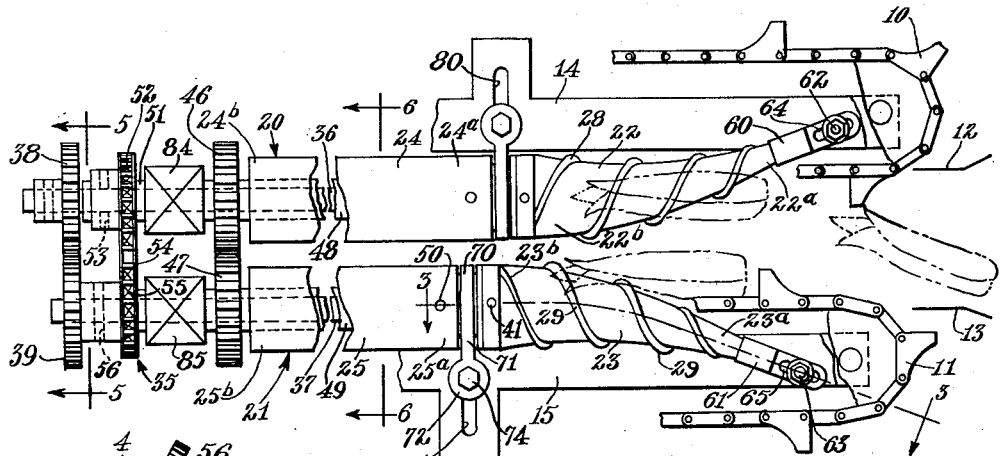
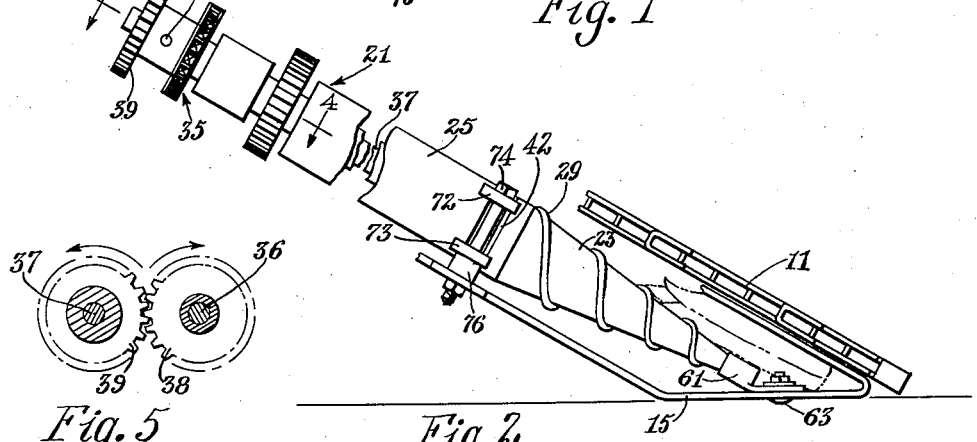
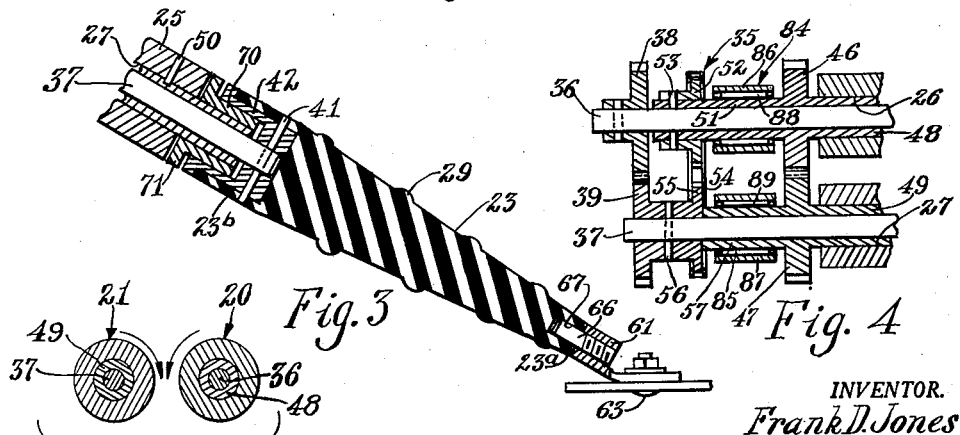
INVENTOR.
Frank D. Jones
BY
C. T. Parker and W. A. Murray
Attorneys United States Patent Office 2,927,414
Patented Mar. 8, 1960

2,927,414

EAR PICK-UP ROLLERS FOR CORN HARVESTERS

Frank D. Jones, Moline, Ill., assignor, by mesne assignments, to Deere & Company, a corporation of Delaware Application July 29, 1957, Serial No. 674,940

10 Claims. (Cl. 56—104)

This invention relates to a corn harvester and more particularly to the harvesting mechanism associated with a harvester.

The conventional type of corn harvester incorporates the use of a pair of cooperating rotatable rolls which are transversely spaced apart to form a passage through which the stalks of corn may move. The rolls are rotated so that adjacent sides thereof move downwardly to drive the stalks downwardly and to cause the ears to be severed from the stalks upon their coming into contact with the rolls. In the normal operation of a harvester over a field of corn, there are a number of ears of corn which have either fallen from the stalks or are on stalks which are bent over so that the ear rests adjacent to the ground. There is therefore the requirement that the harvester provides some means for picking up these ears and move them rearwardly into the harvester rolls. There have, of course, been several methods tried to improve the pick-up ability of the harvester. The more common method presently used is to provide diverging gathering housing at the forward end of the stalk passage which tends to guide the bent over stalks and fallen ears rearwardly into the harvester rolls. The pick-up characteristic of this type structure is generally dependent entirely upon the aggressive characteristics of the forward ends of the snapping rolls and the conventional gathering chains of the harvester. It is felt that a more positive aggressive effort would be of considerable advantage in picking up fallen ears from the ground.

It is therefore the primary object of this invention to provide an additional positive means for picking up ears of corn from the ground. For illustration purposes, the positive means will be in the form of a forward continuation of the snapping rolls, the continuation being composed of a flexible or rubber type of roll which flares outwardly from the forward end of the snapping roll section.

A further feature or object of the invention is to provide a drive mechanism which drives the snapping roll portion or section of the roll assembly so that adjacent sides move downwardly and which further provides for adjacent sides of the forward flexible section to move in the opposite direction or so that adjacent sides of the flexible sections move upwardly.

It is a further object of the invention to provide support means for the harvester roll assemblies which permit the snapping portions or sections to move transversely, while at the same time suitable adjustment may be made in the mounting means for the forward flexible sections so as to compensate for the transverse movement of the snapping sections.

Other objects and advantages of the present invention will become apparent to those skilled in the art as the nature of the invention is better understood from the following detailed description as illustrated in the accompanying drawings.

Fig. 1 is a plan view of the harvester roll unit and portions of the associated harvesting mechanism. For purposes of clarity portions of the rolls have been removed.

Fig. 2 is the side view of the harvester roll means as shown in Fig. 1.

Fig. 3 is an enlarged sectional view of the forward section of the harvest roll assembly as taken substantially along the lines 3—3 of Fig. 1.

Fig. 4 is a sectional view of the drive means taken substantially along the lines 4—4 of Fig. 2.

Fig. 5 is a sectional view taken along the lines 5—5 of Fig. 1.

Fig. 6 is a sectional view taken substantially along the lines 6—6 of Fig. 1.

The harvester roll means to be described may be used in any conventional type corn harvester and may be utilized in one similar to that shown and described in U.S. Patent 2,622,382 issued to W. E. Slavens. For purposes of orientation, the harvester roll means is shown in conjunction with their relationship to a pair of gathering chains 10, 11 mounted on opposite sides of the stalk passage. Gathering structure is indicated in representative form at 12, 13. Harvester framework 14, 15, positioned on opposite sides of the passage serve as basic support for the harvester roll assemblies as well as the forward end of the gathering chains.

The harvester roll means includes a pair of elongated roll assemblies positioned in side by side relation and on opposite sides of the stalk passage. The roll assemblies 20, 21 are composed of forward roll sections 22, 23, respectively, and rear roll sections 24, 25, respectively. The rear sections 24, 25 are of metallic content, usually in the form of a ferrous metal, and have front and rear ends 24a, 24b and 25a, 25b, respectively. The rolls 24, 25 have hollow centers 26, 27, the purpose of which will later be explained.

The forward roll sections 22, 23 are composed of resilient or rubber material and have their rear ends continuous with the forward ends 24a, 25a of the snapping roll sections 24, 25. As shown in Fig. 1, the forward sections 22, 23 are flared forwardly outwardly from the stalk passage. The forward sections 22, 23 are molded so as to have a spiraled rubber rib on the outer periphery.

Drive means indicated in its entirety by the reference numeral 35 are at the rear of the harvester roll assemblies 20, 21. The forward sections 22, 23 are driven so that their adjacent sides move upwardly by means of elongated shafts 36, 37 which extend from the drive means 35 and through the hollowed centers 26, 27 of the rear roll sections 24, 25. The drive shaft 36 is driven in a clockwise direction, as viewed in Fig. 5, by the main power source of the harvester. This type of drive is conventional and while not shown in the present specification, is fully shown and described in the aforesaid Slavens patent. Fixed to the drive shaft 36 and 37 are a pair of meshing gears 38, 39. As appears in Fig. 5, the meshing sides of the gears 38, 39 move upwardly. The shafts 36, 37 extend forwardly from the gears 38, 39 through the hollowed centers 26, 27 of the roll portions 24, 25 and are fixed by pins, as at 41 to front trunnions, only one of which is shown at 42 in Fig. 3. The forward rubber roll sections are fixed to their respective trunnions in the first instance by the elastic nature of the rubber material which fits over the outer periphery of the trunnion and in the second instance by the pins 40, 41 which extend through the shaft 36, 37, the trunnions, and the rear sections of the rubber roll portions 22, 23.

The rear sections 24, 25 of the harvester rolls are driven by a pair of spur gears 46, 47. The gear 46 includes a forwardly extending hub or forward portion 48 which is fixed to the rear section 24. The inner surface of the front portion 48 serves as a bushing surface for the shaft 36. The right rear section 25 is fixed by a pin 50 to a hub portion 49 of the gear 47. The inner surface of the hub portion 49 serves as a journaling surface for the drive shaft 37.

The hub of the gear 46 also extends rearwardly as at 51 and has at its rear end a chain sprocket 52 pinned, as at 53 to it. The sprocket 52 is driven by a chain 54 which in turn is driven by means of a chain sprocket 55, which is integral with the gear 39 and which is pinned, as at 56, to the drive shaft 37. A rearward extension 57 of the gear 47 abuts against the face of the sprocket 55 and operates as a spacer between the gear 47 and the sprocket. By following the drive from the shaft 36 and its attached pinion 38 through the gear 39 and chain and sprocket drive 52, 54, 55, the meshing sides of the gears 46, 47 will be determined as moving downwardly with the consequential effect that the adjacent sides of the rolls 24, 25 will also move downwardly.

The corn harvester roll means are mounted on the harvester frame by journal means spaced axially along the respective roll assemblies. The journal means at the forward end of the forward flexible element or sections 22, 23 of the harvesting roll assemblies comprise mounting brackets 60, 61 which are bolted as at 62, 63 to the frame plates 14, 15. The brackets 60, 61 contain slots 64, 65, respectively, to permit lengthwise adjustment of the roll sections 22, 23. The bearing brackets 60, 61 have tapped sections in which are threaded stub shafts, only one of which is shown at 66 in Fig. 3. A portion of the stub shafts extends rearwardly from the mounting brackets 60, 61 into axial openings, only one being shown at 67, in the rubber roll sections 22, 23. The surface of the rearward extensions of the stub shafts serves as a bearing on which the forward flexible roll sections may rotate.

Rear journal means are positioned at the rear end of the forward flexible roll sections 22, 23 and forwardly of the rear rigid sections 24, 25. The latter journal means supporting the right roll assembly 21 comprises an axially extending journal hub 70 (see Fig. 3), the outer surface of which supports the trunnion 42 and the inner surface of which journals the elongated hub 27 of the gear 47. The journal hub 70 flanges radially outwardly at 71 and has a pair of outwardly extending ears 72, 73 which have vertically alined openings through which a bolt 74 may pass. The bolt 74 also extends through a transverse slot 75 in the frame plate 15. A spacer 76 is provided between the lower ears 73 and the plate 15.

Relative to the rear journal means supporting the left roll assembly 20, the structure is identical to that on the right roll assembly 21 and detail of the exact structure is not necessary. A transverse slot 80 is provided to permit lateral adjustment of the roll assembly 20. Therefore, lateral or transverse adjustment of both rolls is permitted by adjusting the respective bolts transversely in the slots 75 and 80. With adjustment of the roll assemblies 20, 21 for purposes of increasing or decreasing the width of the stalk passage, adjustment of the forward end of the flexible roll sections 22, 23 must also be made. As mentioned previously the slots 64, 65 are provided in the brackets 60, 61 for purposes of accommodating lateral or transverse movement of the rear end of the sections 22, 23. Also, while the transverse adjustment of the roll assemblies 20, 21 has been shown as being manual, such was shown only for purposes of illustration and it should be recognized that there are other types of lateral transverse adjustment means for the harvester rolls. An example of a remote adjustment of the harvester rolls is shown in U.S. patent issued to N. F. Andrews 2,721,431. Therefore, the transverse adjusting means was shown as such in the present instance as representing only one of several such means.

The snapping roll assemblies 20, 21 are also supported at their rear by transversely spaced journal means 84, 85. The bearing or journal sections 84, 85 are primarily basically supported on the harvester frame in conventional manner, and include bearing housings 86, 87 which carry bearings 88, 89 which engage the outer surface of the hub 51, 57. The bearing assemblies 84, 85 are articulately mounted on the harvester frame so as to permit the lateral adjustment of the forward ends of the roll assemblies 20, 21.

In operation the roll assemblies 20, 21 operate in the following manner. As is conventional, the stalks will move into the stalk passage and between the rigid sections 24, 25 which in turn will drive the stalks downwardly until the ears of corn strike the roll sections 24, 25 to be severed from the stalk. The forward roll sections 22, 23 will engage ears of corn lying adjacent to the ground and by the effect of the roll sections rotating opposite to the rear sections 24, 25 or so that adjacent sides move upwardly, the ears of corn will tend to be picked up and fed rearwardly to the rear sections 24, 25. Due to the flexible characteristics of the rubber the forward sections 22, 23 are permitted to rotate while at the same time being flared outwardly and angularly from their drive shafts 36, 37. The forward ends 22, 23 being flexible, will also remain uninjured should they strike a stone, rock, or other type of projection which might normally lie in the field. For this reason, the forward end of the sections 22, 23 may be positioned adjacent to the ground where they will contact the ears lying on the ground.

While only one form of the invention has been shown, it should be clearly understood that such is shown only for purposes of illustration and there is no intention to narrow or limit the invention beyond the broad general principles herein claimed.

What is claimed is:

1. Harvester roll means for use with a corn harvester comprising: a pair of elongated roll assemblies positioned in side-by-side relation and forming between them a passage through which stalks of corn may pass, each roll assembly including a forward roll section and a rear roll section, the rear section being rigid and having front and rear ends and a hollowed center, and the forward section being composed of resilient material and having a rear end adjacent and continuous with the forward end of the rear section, said forward section having its axis curving forwardly outwardly relative to the passage; drive means at the rear of the rear sections operative to rotate said rear sections to cause adjacent sides thereof to move downwardly, the drive means also including a pair of rotating drive shafts extending through the hollowed centers of the respective sections and rotating in opposite directions than their adjacent rear sections; means connecting the forward roll sections to the shafts whereby the adjacent sides of the forward sections shall move upwardly; and journal means spaced lengthwise along said roll assemblies for mounting the assemblies on the harvester including transversely spaced journals at the forward end of the forward roll sections for retaining the respective forward end outwardly of the passage.

2. Harvester roll means for use with a corn harvester comprising: a pair of elongated roll assemblies positioned in side-by-side relation and forming between them a passage through which stalks of corn may pass, each roll assembly including a forward roll section and a rear roll section, the rear section being rigid and having front and rear ends and a hollowed center, and the forward section being composed of resilient material and having its axis curving forwardly outwardly relative to the passage; drive means at the rear of the rear sections operative to rotate said rear sections to cause adjacent sides thereof to move downwardly, the drive means also including a pair of rotating drive shafts extending through the hollowed centers of the respective sections and rotating in opposite directions than their adjacent rear sections; means connecting the forward roll sections to the shafts whereby the adjacent sides of the forward sections shall move upwardly; and journal means spaced lengthwise along said roll assemblies for mounting the assemblies on the harvester including transversely spaced journals at the forward end of the forward roll sections for retaining the respective forward end outwardly of the passage.

3. A harvester roll assembly comprising a forward roll section and a rear roll section, the rear section being rigid and having front and rear ends and a hollowed center, and the forward section being composed of flexible material and having a rear end adjacent and continuous with the forward end of the rear section and having its axis curving forwardly outwardly therefrom to front supported ends; drive means at the rear of the rear section operative to rotate said rear section in one direction, the drive means also including a rotating drive shaft extending through the hollowed center of the section and rotating in the opposite direction than the rear section; means connecting the forward section to the shaft whereby the forward section shall rotate in the opposite direction.

4. On a corn harvester movable forwardly over a field of row planted corn and having harvesting means forming a stalk passage for successively receiving the stalks of corn as the harvester moves over a row of corn the improvement residing in ear pick-up means comprising: a pair of elongated rotatable ear pick-up elements on opposite sides of the passage and forwardly of the harvesting means, each of said elements having front and rear ends and being composed of resilient material and having its rear end adjacent the forward end of the harvesting means and having its axis curving forwardly and outwardly therefrom; drive means including a pair of rotating drive shafts extending forwardly from the harvesting means; means connecting the rotatable elements to the shafts to cause the adjacent sides of the elements to move upwardly; and journal means spaced lengthwise along the elements for mounting the elements on the harvester including transversely spaced journals at the forward ends of the elements for retaining the forward ends outwardly of the passage.

5. On a corn harvester movable forwardly over a field of row planted corn and having harvesting means forming a stalk passage for successively receiving the stalks of corn as the harvester moves over a row of corn the improvement residing in ear pick-up means comprising: an elongated rotatable ear pick-up element on one side of the passage and forwardly of the harvesting means, the element having front and rear ends and being composed of resilient material and having its rear end adjacent the forward end of the harvesting means and having its axis curving forwardly and outwardly therefrom; drive means including a rotating drive shaft extending forwardly from the harvesting means; means connecting the rotatable element to the shaft to cause the inner side of the element relative to the stalk passage to move upwardly; and journal means spaced lengthwise along the element for mounting the element on the harvester including transversely spaced journals at the forward ends of the elements for retaining the forward ends outwardly of the passage.

6. On a corn harvester movable forwardly over a field of row planted corn and having harvesting means forming a stalk passage for successively receiving the stalks of corn as the harvester moves over a row of corn the improvement residing in ear pick-up means comprising: a fore-and-aft extending elongated rotatable ear pick-up element on one side of the passage and forwardly of the harvesting means, the element having front and rear ends and being tapered from its rear to its front end and being composed of resilient material and having its rear end adjacent the forward end of the harvesting means and having its axis curving forwardly and outwardly therefrom to its forward end, the element being inclined to the horizontal and having its forward end proximate to the ground; drive means including a rotating drive shaft extending forwardly from the harvesting means; means connecting the rear end of the rotatable element to the shaft to cause the inner side of the element relative to the stalk passage to move upwardly; and journal means spaced lengthwise along the element for mounting the element on the harvester including a journal at the forward end of the element retaining the element outwardly of the passage.

7. A harvester roll assembly comprising a forward roll section and a rear roll section, the rear section being rigid and having front and rear ends, and the forward section being composed of flexible material and having a rear end adjacent and continuous with the forward end of the rear section and having its axis curving forwardly outwardly therefrom; and drive means at the rear of the rear section operative to rotate said rear section in one direction and the forward section in the opposite direction.

8. The invention defined in claim 7, in which the forward section is composed of a rubber material.

9. On a harvester movable forwardly over a field and having harvesting mechanism forming a passage for successively receiving plants in the field as the harvester moves over the field, the improvement residing in pick-up means comprising: a rear pair of journal means proximate to one another and on opposite sides of the passage forwardly of and adjacent to the harvesting mechanism; a forward pair of journal means on opposite sides of the passage adjacent to the ground and spaced outwardly and forwardly relative to the rear pair of journal means; and a pair of elongated rotatable elements of resilient composition on opposite sides of the passage having opposite ends extending between and journaled to the respective rear and forward journal means, the axes of the rotatable elements being arcuately disposed whereby the rotatable elements will flex during rotation thereof.

10. The invention defined in claim 9 in which the rear pair of journal means are adjustable transversely and the forward pair of journal means are mounted on the harvester to accommodate transverse adjustment of the rear pair of journal means.

References Cited in the file of this patent

UNITED STATES PATENTS

| | | |
|---|---|---|
| 1,806,624 | Glover et al. | May 26, 1931 |
| 2,334,945 | Mitchell et al. | Nov. 23, 1943 |
| 2,366,408 | Jenson | Jan. 2, 1945 |
| 2,564,319 | Beck | Aug. 14, 1951 |
| 2,678,526 | Voss | May 18, 1954 |